US010641378B2

(12) United States Patent
Vizier

(10) Patent No.: US 10,641,378 B2
(45) Date of Patent: May 5, 2020

(54) POWER-STEERING PUSH BUTTON HAVING A SHOCK ABSORBER WITH A CONICAL BASE

(71) Applicant: JTEKT EUROPE, Irigny (FR)

(72) Inventor: Pascal Vizier, Lyons (FR)

(73) Assignee: JTEKT EUROPE, Irigny (FR)

( * ) Notice: Subject to any disclaimer, the term of this patent is extended or adjusted under 35 U.S.C. 154(b) by 302 days.

(21) Appl. No.: 15/566,545

(22) PCT Filed: Apr. 14, 2016

(86) PCT No.: PCT/FR2016/050865
§ 371 (c)(1),
(2) Date: Oct. 13, 2017

(87) PCT Pub. No.: WO2016/177947
PCT Pub. Date: Nov. 10, 2016

(65) Prior Publication Data
US 2018/0094715 A1 Apr. 5, 2018

(30) Foreign Application Priority Data
May 4, 2015 (FR) ...................... 15 53968

(51) Int. Cl.
*F16H 55/28* (2006.01)
*B62D 3/12* (2006.01)
(52) U.S. Cl.
CPC ........... *F16H 55/283* (2013.01); *B62D 3/123* (2013.01)
(58) Field of Classification Search
CPC ............................ F16H 55/283; B62D 3/123
See application file for complete search history.

(56) References Cited

U.S. PATENT DOCUMENTS 4,271,716 A * 6/1981 Carduner ............... B62D 3/123
74/422
5,802,919 A * 9/1998 Phillips ................. F16H 55/283
384/37

(Continued)

FOREIGN PATENT DOCUMENTS

DE 195 01 761 C1 7/1996
DE 10 2004 004390 A1 8/2005
EP 2754600 A1 7/2014

OTHER PUBLICATIONS

Sep. 13, 2016 International Search Report issued in International Patent Application No. PCT/FR2016/050865.

*Primary Examiner* — Terence Boes
(74) *Attorney, Agent, or Firm* — Oliff PLC

(57) ABSTRACT

A play take-up device comprising a push button that is movably mounted and translationally guided, along a thrust axis 5, in a housing, to exert a thrust force against a rack, said device further comprising a resilient shock-absorbing member that is positioned between the push button and the housing, in contact, respectively, against a first bearing surface belonging to the push button, which is angled in relation to the thrust axis, and is preferably frusto-conical, and a second bearing surface belonging to the housing, referred to which has, opposite the distribution surface and counter to the resilient shock-absorbing member, both a radially extending component and an axially extending component, such that the shock-absorbing member simultaneously returns the push button axially towards the rack and transversely towards the thrust axis.

20 Claims, 4 Drawing Sheets

(56) References Cited

U.S. PATENT DOCUMENTS

| | | | | |
|---|---|---|---|---|
| 5,845,532 A * | 12/1998 | Phillips | ................ | B62D 3/123 |
| | | | | 74/422 |
| 5,931,046 A * | 8/1999 | Phillips | ................ | B62D 3/123 |
| | | | | 384/37 |
| 2008/0006110 A1* | 1/2008 | Douma | ................ | B62D 3/123 |
| | | | | 74/422 |
| 2015/0166098 A1* | 6/2015 | Lingemann | ............ | B62D 3/123 |
| | | | | 74/409 |
| 2019/0135329 A1* | 5/2019 | Feldpausch | ............ | B62D 3/123 |

* cited by examiner

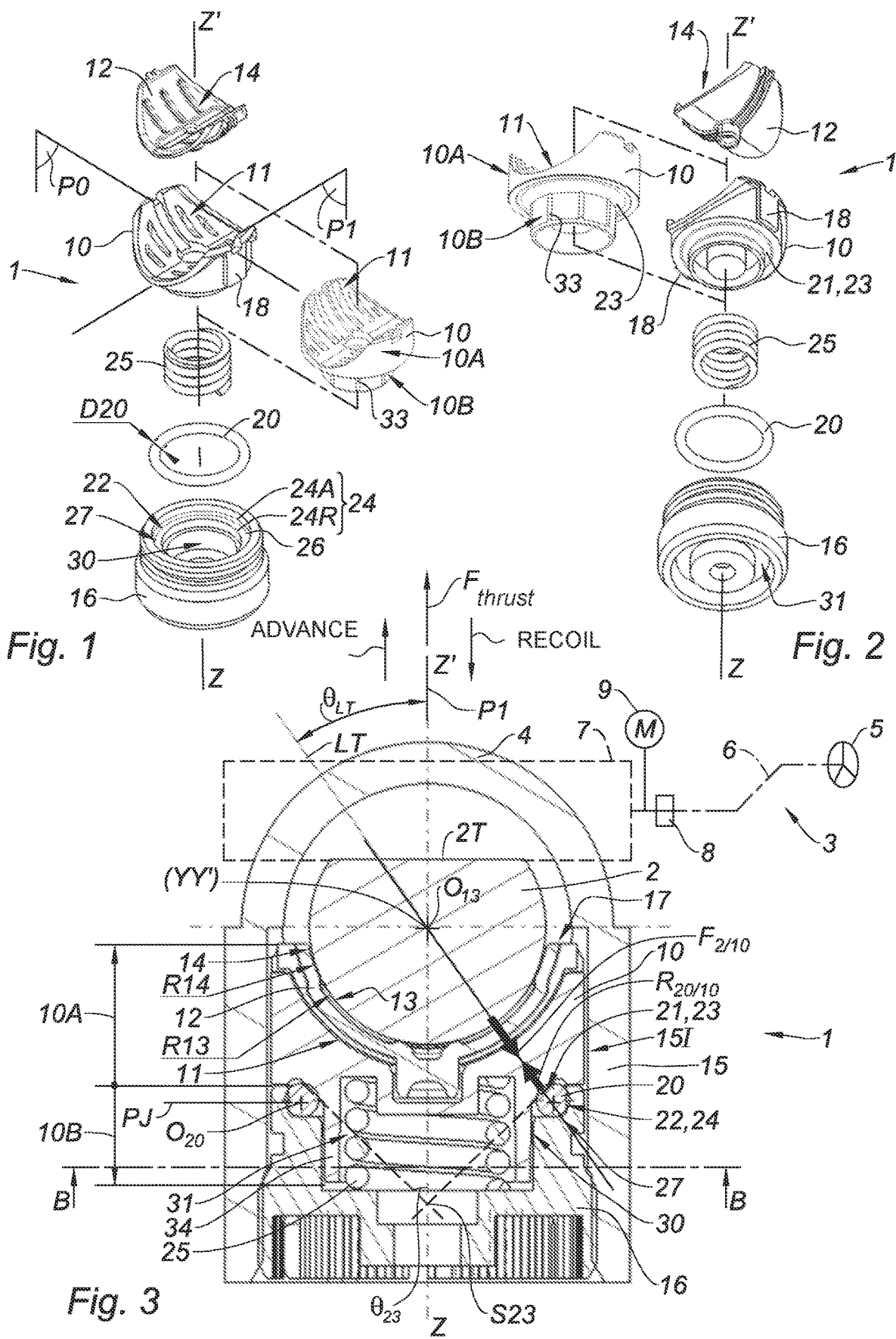

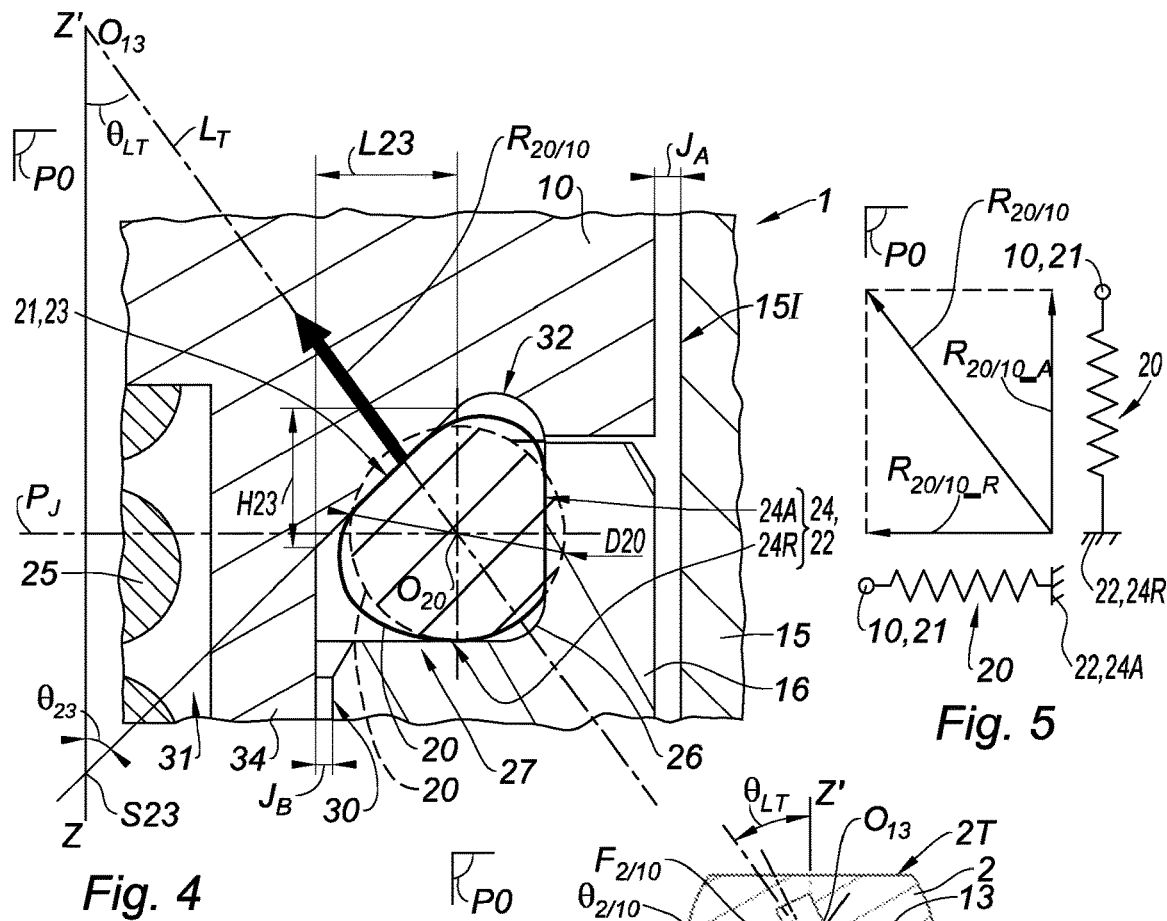
Fig. 4
Fig. 5
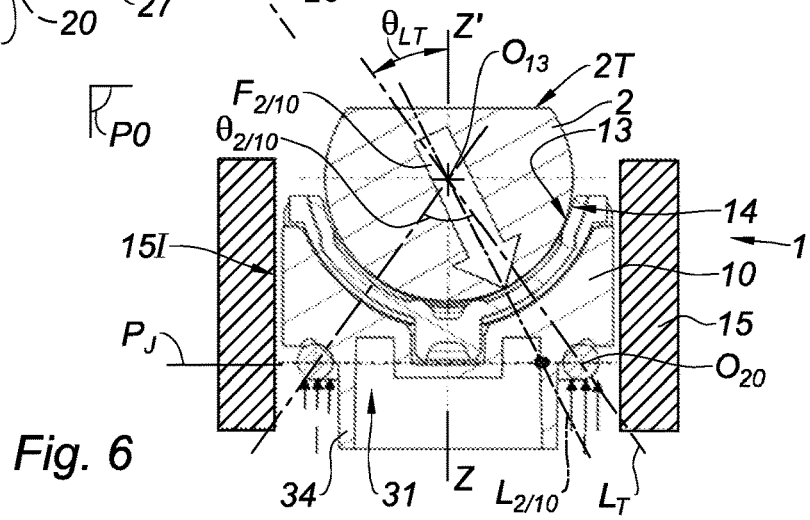
Fig. 6
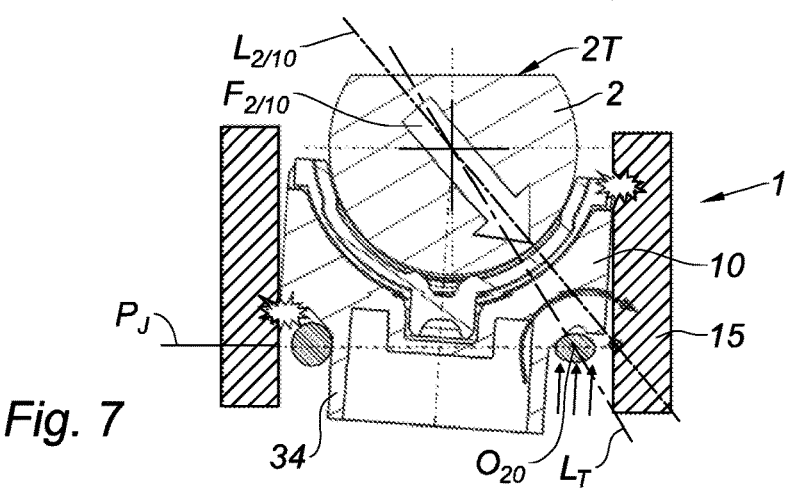
Fig. 7

Detail E

Section D-D

Section C-C

POWER-STEERING PUSH BUTTON HAVING A SHOCK ABSORBER WITH A CONICAL BASE

The present invention relates to the general field of clearance compensation mechanisms used in particular to limit the meshing clearances within the steering modules of motor vehicles.

More particularly, it concerns a clearance compensation device for a rack, comprising a tappet intended to bear against the back of a rack, in particular a steering rack, in order to press the teeth of said rack against the teeth of a pinion, which drives said rack.

There are already known devices comprising a tappet, which forms a piston movably, mounted in translation in a jacket, and which is placed under the stress of a helical spring, which presses said tappet against the rack, opposing the pinion.

In order to ensure a relatively accurate guiding and a low-noise operation of the tappet in the jacket, said tappet is generally fitted with O-ring seals, housed and stepped axially, such as segments, in annular grooves drilled in the side wall of said tappet.

Said O-ring seals remain in scraping support against the inner wall of the jacket during the alternating forward and backward axial movements of the tappet, which allows limiting the radial travel of said tappet.

While such an arrangement generally gives satisfaction, it may however suffer from some limitations.

In particular, when the steering is subjected to a considerable force or to vibrations, it is punctually possible that the tappet tilts laterally to the extent of hitting the jacket, thereby producing a metallic impact noise and may possibly damage the clearance compensation device or accelerate the wear thereof.

Furthermore, as the tappet generally has a diameter quite larger than its axial height, a tilting of said tappet may easily cause, by over-center, a jamming of the tappet, and therefore more generally a blocking of the return mechanism responsible of pressing the rack against the pinion, thereby disturbing the proper operation of the clearance compensation device.

In order to limit this risk of tilting and of impact between the tappet and the jacket, it is certainly known to request a very accurate guiding of the tappet, by considerably reducing the admissible tolerance intervals for the realization of the respective diameters of the tappet and of the jacket.

Nonetheless, such a quality requirement particularly complicates the manufacture of the considered parts, and increases the cost price of the tappet as well as the reject rate.

Furthermore, the narrowness of the radial guide clearance, that is to say the small dimensional deviation between the outer diameter of the tappet and the inner diameter of the jacket, may complicate the initial insertion of said tappet into said jacket, during the assembly of the clearance compensation device. In particular, the smallest centering or inclination defect of the tappet, during the insertion of said tappet, may then cause an accidental contact of said tappet with the wall of the jacket, and an irreversible jamming of said tappet in the jacket by over-center.

The implementation of a plurality of stepped O-ring seals may also have specific drawbacks.

First, the tappet must be sufficiently axially long in order to be able to accommodate all said O-ring seals, which tends to increase the bulk of the device.

In this respect, it is sometimes difficult to reconcile the requirements related to the overall bulk of the clearance compensation device, which incite to make a tappet which is as compact as possible, and therefore as short as possible, with the functional requirements of said clearance compensation device, which impose that the tappet has an axial height which is sufficient not only to accommodate all the O-ring seals but also to minimize the risks of jamming of the tappet in the jacket by over-center.

Afterwards, the implementation of a plurality of O-ring seals also increases the complexity of the device, and consequently its manufacturing cost, in particular because it is necessary to provide for a specific machining of the tappet, including in particular the realization of several grooves intended to accommodate said seals, and then to proceed to a succession of several assembly operations for the setting up of said seals.

Furthermore, the scraper O-ring seals, compressed against the wall of the jacket, create frictions which may oppose the action of the helical spring, and thus disturb the return function of the tappet, and even cause a tilting of the tappet and a blockage by over-center.

Moreover, the O-ring seals may be subject to wear and creep by squashing at contact with the jacket, which may cause the apparition of a radial clearance, and therefore some progressive loss of the radial holding of the tappet, which may be, here again, at the origin of the occurrence of noises during the operation of the steering module.

Consequently, the objects assigned to the invention aim to overcome the aforementioned drawbacks, and to propose a clearance compensation device for a rack which has a silent and reliable operation, while being compact, inexpensive to manufacture and relatively simple.

The objects assigned to the invention are achieved by means of a clearance compensation device for a rack, said device comprising a tappet intended to exert a thrust force against a rack, said tappet being movably mounted and guided in translation, according to a thrust axis (ZZ'), in a casing which is arranged so as to form, on the one hand, an axial stop which hinders the axial recoil of the tappet according to the thrust axis (ZZ') and, on the other hand, a radial stop which hinders the radial distance of the tappet transversely to the thrust axis (ZZ'), said device also comprising an elastic damping member, which is interposed between the tappet and the casing, bearing respectively against a first bearing surface belonging to the tappet and a second bearing surface belonging to the casing, said device being characterized in that at least one of said first and second bearing surfaces, called « distribution surface », is inclined with respect to the thrust axis (ZZ'), and in that the other of said first and second bearing surfaces, called « seat surface », has, facing the distribution surface and against the elastic damping member, at least one radial extension component, which allows said seat surface to act axially on the damping member, and at least one axial extension component, which allows said seat surface to act radially on the damping member so that, when the tappet compresses the elastic damping member against the casing, the elastic damping member exerts, in response on the tappet, a retaining force which tends to return simultaneously said tappet axially in the direction of the rack and transversely in the direction of the thrust axis (ZZ').

Advantageously, the use of an inclined distribution, in particular frusto-conical, surface allows transmitting to the elastic damping member or, reciprocally, receiving from the latter, a force, herein a retaining force, which comprises simultaneously an axial component (substantially parallel to the thrust axis (ZZ')) and a radial component (substantially perpendicular to the axial component, and more particularly substantially perpendicular to the thrust axis (ZZ')).

Advantageously, the distribution of the respective intensities of said axial and radial components depends in particular on the value chosen for the angle of inclination of said distribution surface with respect to the thrust axis (ZZ').

Advantageously, the invention combines this inclined distribution surface with a seat surface which is arranged so as to form a stop against the elastic damping member, both radially and axially, that is to say with a seat surface which is capable of taking on, both axially and radially, the forces exerted by the distribution surface on the damping member and which are afterwards transmitted to said seat surface, via said damping member.

Thus, the arrangement proposed by the invention allows, by means of one single inclined distribution surface engaging one single elastic damping member, to generate and transmit, from the casing toward the tappet, a retaining force which comprises a significant axial component, generated by the axial elastic compression of the damping member, and which opposes the axial depression of the tappet, as well as a significant radial component, generated by the radial elastic compression of the damping member, and which opposes the lateral offset of the tappet relative to the thrust axis (ZZ'), so that said retaining force efficiently and effectively opposes the different deflecting and tilting movements of the tappet.

Advantageously, the interface comprising the inclined distribution surface, the damping member, and the seat surface, creates, precisely due to its arrangement, a bidirectional return spring which has a dual stiffness, namely a radial stiffness, which tends to re-center the tappet on its thrust axis (ZZ'), as well as an axial stiffness, which tends to return said tappet toward the rack.

Thanks to the bidirectional compensation action of the elastic damping member, which action is effectively taken over by the bearing surfaces due to the orientation of the latter, the invention allows effectively reducing the lateral tilting phenomenon of the tappet in the casing.

It should be noted that, when properly combined to the bearing surfaces with adequate shape and orientation, one single elastic damping member, where appropriate with a very simple shape, and more particularly one single O-ring seal, can then be sufficient to fill the balancing, centering and guiding role of the tappet which has been attributed so far to a set of several O-ring seals axially stepped along the tappet.

By concentrating the axial elastic dampening function and the radial elastic dampening function within a reduced space, and by using few parts to obtain these elastic dampening functions, the clearance compensation device of the invention advantageously allows gaining in simplicity and in compactness, and reducing the manufacturing costs.

Other objects, features and advantages of the invention will appear in more detail upon reading the following description, as well as with reference to the appended drawings, provided only for an illustrative and non-restrictive purpose, among which:

FIG. 1 illustrates, according to an exploded top perspective view, a clearance compensation device according to the invention, with two possible variants of the tappet.

FIG. 2 illustrates, according to an exploded bottom perspective view, the clearance compensation device of FIG. 1, with the two variants of the tappet.

FIG. 3 illustrates, according to a sectional view in a plane normal to the longitudinal axis (YY') of the rack, herein corresponding to a plane of symmetry of the tappet containing the thrust axis (ZZ'), a steering mechanism provided with a clearance compensation device according to FIG. 1 or 2.

FIG. 4 illustrates, according to a detail sectional view, the elastic junction provided by the damping member between the distribution surface and the seat surface of a clearance compensation device of FIG. 3.

FIG. 5 schematically illustrates the bidirectional dampening effect obtained against the tappet within a clearance compensation device according to the invention, in particular within the device of FIG. 4.

FIG. 6 illustrates, according to a sectional view in a plane normal to the longitudinal axis (YY') of the rack and containing the thrust axis (ZZ'), the anti-tilt self-balancing effect of the tappet obtained due to the fact that the damping member is placed radially overhang from the line of action according to which the rack presses the tappet, within a device according to the invention, such as the device of FIGS. 1 to 4.

FIG. 7 illustrates, according to a sectional view in a plane normal to the longitudinal axis (YY') of the rack and containing the thrust axis (ZZ'), the lateral tilting phenomenon of the tappet that the arrangement of the device allows to avoid according to the invention.

Figure 8:
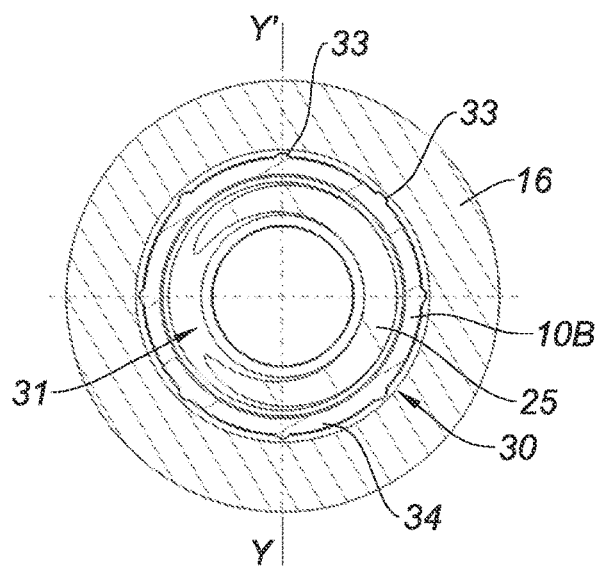

FIG. 8 illustrates, according to a sectional view in a plane normal to the thrust axis (ZZ'), the guiding of the foot portion of the tappet in a guide bore drilled in the yoke of the device of FIG. 3.

Figure 9:
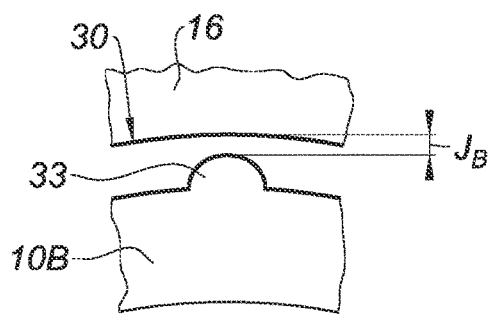

FIG. 9 illustrates, according to a partial view, the detail of the definition of the functional radial clearance between a guide rib of the foot portion of the tappet and the bore of the yoke.

Figure 10:
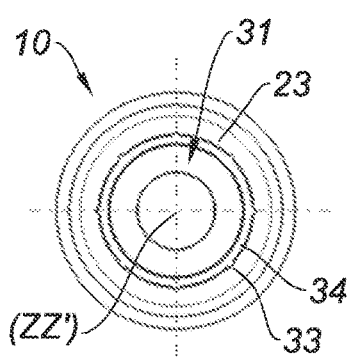
Figure 11:
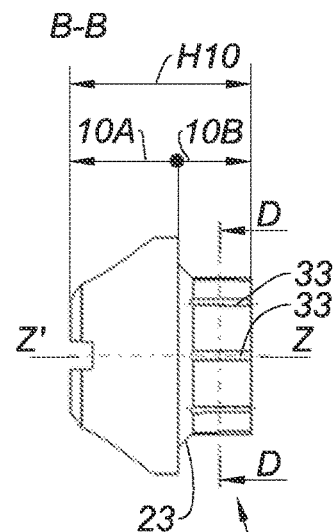
Figure 12:
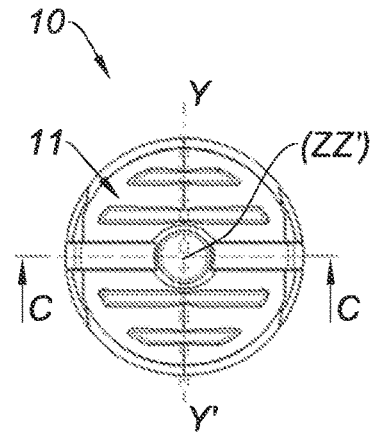

FIGS. 10, 11 and 12 illustrate, according to respectively bottom, side and top projection views, the tappet of the device of FIGS. 1 to 4.

Figure 13:
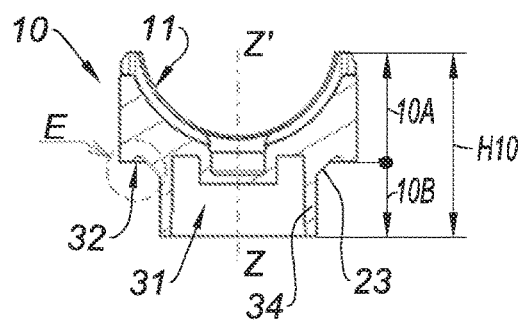

FIG. 13 illustrates a sectional view of the tappet of FIGS. 10 to 12, in a plane containing the thrust axis (ZZ') and corresponding to a plane of symmetry of said tappet normal to the axis of the rack (YY').

Figure 14:
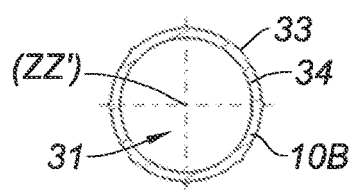

FIG. 14 represents, in a plane perpendicular to the thrust axis (ZZ'), the cross-section of the foot portion of the tappet of FIGS. 10 to 13.

Figure 15:
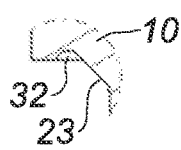

FIG. 15 illustrates, according to a partial view of the tappet of FIG. 13, the detail of an inclined distribution surface which is prolonged by a disengagement groove intended to accommodate the constitutive matter of the damping member when said material is expelled by compression under the stress of the tappet and of the rack.

Figure 16:
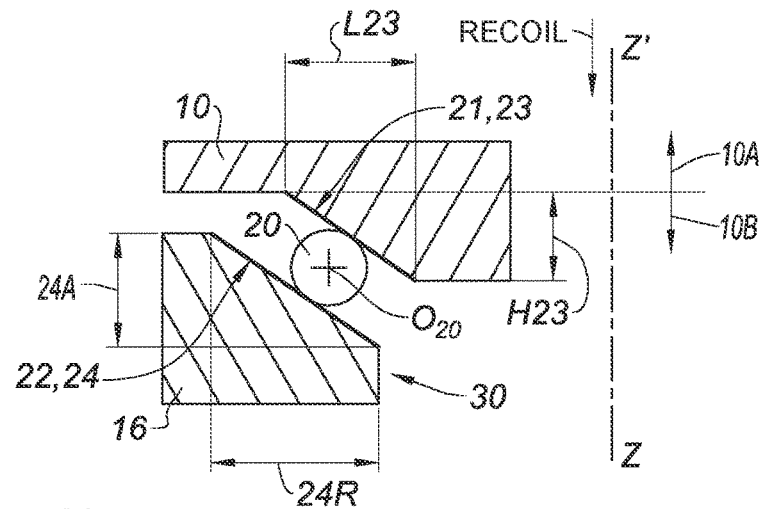

FIG. 16 illustrates, according to a partial longitudinal sectional view, in a plane containing the thrust axis (ZZ'), a variant of an arrangement of the invention in which the distribution surface and the seat surface are both frusto-conical.

Figure 17:
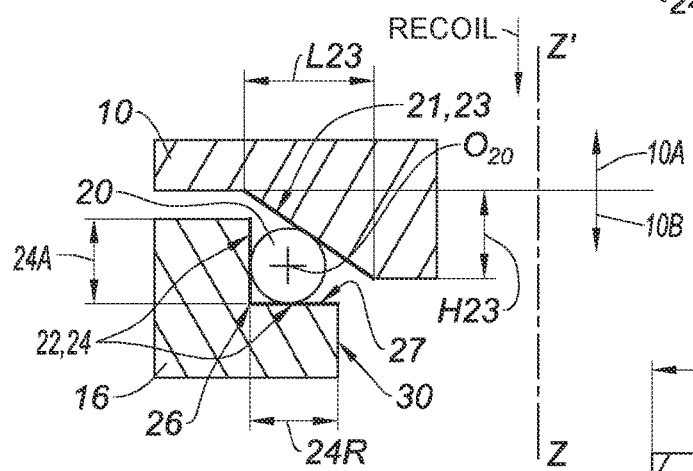

FIG. 17 illustrates, according to a partial longitudinal sectional view, in a plane containing the thrust axis (ZZ'), a variant of an arrangement of the invention in which the tappet carries a frusto-conical distribution surface, and the casing carries a seat surface forming a shoulder, as it is the case for FIGS. 1 to 4.

Figure 18:
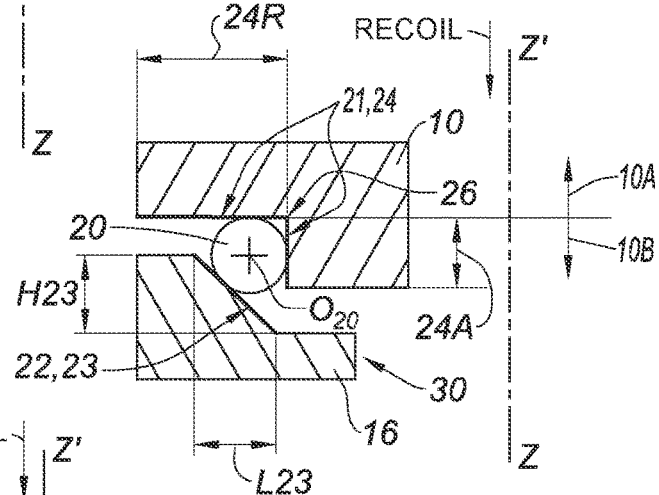

FIG. 18 illustrates, according to a partial longitudinal sectional view, in a plane containing the thrust axis (ZZ'), a variant of an arrangement of the invention in which it is the casing which comprises an inclined distribution, herein frusto-conical, surface, whereas the seat surface forms a shoulder within the tappet.

Figure 19:
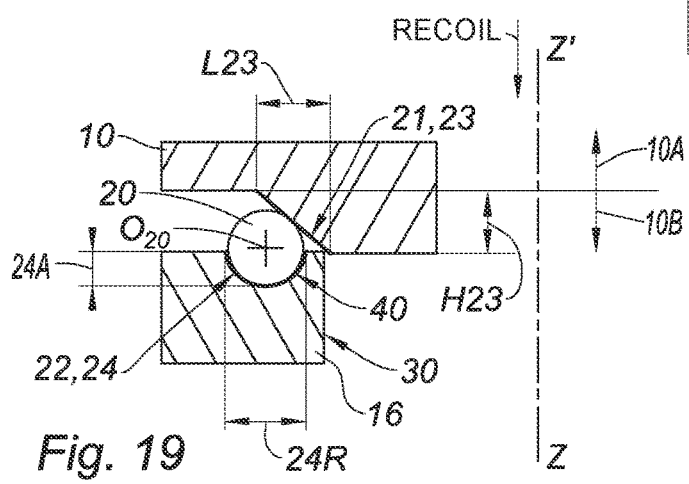

FIG. 19 illustrates, according to a partial longitudinal sectional view, in a plane containing the thrust axis (ZZ'), a variant of an arrangement of the invention in which the tappet carries a frusto-conical distribution surface, and the casing carries a seat surface formed by an annular slot which opens onto a surface of the casing which is substantially perpendicular to the thrust axis (ZZ') and located axially opposite the tappet.

The invention concerns a clearance compensation device 1 for a rack 2.

Preferably, as illustrated in FIG. 3, said rack 2 is part of a steering mechanism 3, and more particularly of a power steering mechanism, which equips a vehicle, such as a motor vehicle.

Advantageously, the rack 2 is movably mounted and guided in translation, according to its longitudinal axis (YY'), in a steering case 4 which is in turn fastened to the chassis of the vehicle.

Preferably, the longitudinal axis (YY') of the rack 2, which will be assimilated in the following to the axis of translation (or «slide axis») of said rack 2, is orientated according to the (left-right) transverse lateral direction of the vehicle.

The steering mechanism 3 further comprises, in a manner known per se, and as schematized in FIG. 3, a steering wheel 5 carried by a steering column 6 and which allows the driver of the vehicle to maneuver the steering.

Preferably, the steering column 6 meshes on the rack 2 by means of a drive pinion 7 (schematized by a dotted line in FIG. 3).

Moreover, the steering column 6 will preferably include a torque sensor 8 intended to measure the torque exerted by the driver on the steering wheel 5.

For example, said torque sensor 8 may be formed by a magnetic sensor measuring the elastic deformation of a torsion bar interposed between the upstream portion of the steering column 6 carrying the steering wheel 5 and the downstream portion of said steering column 6 carrying the drive pinion 7 which meshes on the rack 2.

Moreover, the rack 2 is linked, preferably at each of its ends (left and right, with reference to the reference frame attached to the vehicle), to a steering tie rod, herein respectively a left tie rod and a right tie rod, which tie rod is in turn connected to a knuckle carrying a steered (and preferably drive) wheel of the vehicle, herein respectively a left wheel and a right wheel.

Thus, the displacement of the rack 2 (herein in translation, according to the axis (YY'), relative to the steering case 4) allows modifying the steering angle (the yaw orientation) of said steered wheels.

Moreover, the steering mechanism preferably comprises an assist motor 9, for example hydraulic or electric assist motor, arranged to exert on the rack 2, according to predefined assist laws, an assist torque which allows assisting the maneuver of the steering mechanism.

For example, the assist motor 9 may engage on the steering column 6 itself, as schematized in FIG. 3, preferably by means of a reducer, such as a worm wheel and a worm screw reducer, thereby forming a mechanism called «single-pinion» mechanism.

According to another possible embodiment, the assist motor 9 may engage directly on the rack 2, where appropriate via a reducer, so as to form a mechanism called «double-pinion» mechanism, for example by means of a ball screw engaged on the rack 2 or a second drive pinion meshing on the rack 2 and distinct from the first drive pinion 7 carried by the steering column 6.

Regardless of the arrangement and the number of drive pinions 7 engaging on the rack 2, the device in accordance with the invention aims to stress the teeth 2T of the rack 2 against the teeth of said pinion 7 or of at least one of said pinions 7, in order to compensate the meshing clearances relating to the manufacturing tolerances, to the wear of the mechanism, or to the impacts and vibrations which are experienced by the running gear and transmitted to the rack 2.

To this end, as illustrated in FIG. 3, said device 1 comprises a tappet 10 intended to exert a thrust force $F_{thrust}$ against the rack 2.

More particularly, the tappet 10 is arranged so that the thrust force $F_{thrust}$ tends to press the rack 2 against the drive pinion 7.

To this end, the tappet 10 bears (preferably directly) against the rack 2, on the back of the latter, diametrically opposite the teeth 2T of said rack on which the pinion 7 meshes.

Preferably, the tappet 10 comprises a cradle 11 arranged to accommodate and support the rack 2.

As illustrated in FIGS. 1 to 3 and 13, said cradle 11 preferably has a substantially cylindrical shape whose generator axis is parallel to, and even substantially coincident with, the slide axis (YY') of the rack 2.

Furthermore, the cradle 11 is preferably fitted with a coating or with a pad 12, for example made of a polymer material, which promotes the sliding of the rack 2 in said cradle 11.

In particular, the polymer material used to this end may be a polyamide, of the PA46 or PA66 type, possibly reinforced with fibers, for example carbon fibers, or a PTFE, a silicone or a POM.

Alternatively, the pad 12 may be formed by a metallic sheet covered with a PTFE or resin layer.

Thus, the pad 12, and therefore more generally the tappet 10, offers an (apparent) receiving surface 14 on which a sliding surface 13 belonging to the rack 2 is in sliding support, said sliding surface 13 being formed herein by the smooth back of the rack, located diametrically opposite to the teeth 2T.

Advantageously, the shapes and the dimensions of the pad 12 will allow defining the position and the extent of the contact lines and/or surfaces by which the sliding surface 13 of the rack 2 bears on the receiving surface 14 of the pad 12, and consequently the conformation of the guide structures which guide the displacement of the rack 2 on the pad 12 (and more generally on the tappet 10).

In particular, it is possible to provide for a sliding surface 13 of the rack 2 having a substantially circular arc-shaped profile, whose radius R13 will be strictly smaller than the radius R14 of the corresponding receiving surface 14, which is also substantially circular arc-shaped.

Advantageously, by defining properly the mutual arrangement of the sliding surface 13 and of the receiving surface 14, it is possible to substantially predetermine, with respect to the axis of translation (YY'), the angular sector called «angular sector of action» $\theta_{2/10}$, in which will be located (and will be confined) the «line of force» $L_{2/10}$ according to which the rack 2 will exert its action $F_{2/10}$ on the tappet 10, as illustrated for example in FIG. 6, allowing thereby to adapt the damping system, so as to avoid any lateral tilting of the tappet 10, regardless of the life situation of the vehicle.

Moreover, it should be noted that, depending on the loads experienced by the running gear, and therefore by the rack 2 and by the pinion 7, the action $F_{2/10}$ of the rack 2 on the tappet 10 will be substantially centered, that is to say carried by the thrust axis (ZZ'), or on the contrary directed obliquely with respect to said thrust axis (ZZ'), as represented, in a purely illustrative manner, in FIG. 6, while remaining in principle inside the aforementioned angular sector of action $\theta_{2/10}$.

The tappet 10 may be made, preferably integrally, of a metallic material, such as a molded aluminum alloy or a sintered steel, or further in a sufficiently rigid polymer material, possibly reinforced with fibers, preferably a thermoplastic polymer enabling an injection molding, such as PA46 (polyamide) or PPA (polyphtalamide), possibly reinforced with glass or carbon fibers.

According to the invention, the tappet 10 is movably mounted and guided in translation, according to a thrust axis (ZZ'), in a casing 15, 16.

Said casing 15, 16 is arranged so as to form, on the one hand, an axial stop which hinders the axial recoil of the tappet 10 according to the thrust axis (ZZ'), that is to say which hinders the axial movement according to which the tappet is depressed into the casing 15, 16, under the compression action $F_{2/10}$ exerted by the rack 2 on said tappet 10, with distance from the pinion 7 and, on the other hand, a radial stop which hinders the radial distance of the tappet transversely to the thrust axis (ZZ'), that is to say which opposes the lateral travel, also induced by the action $F_{2/10}$ of the rack 2 on the tappet 10, and according to which the tappet 10 tends to move away (by eccentricity and/or tilting) from the thrust axis (ZZ').

As shown in particular in FIG. 3, the thrust axis (ZZ') is secant, and preferably substantially perpendicular, to the longitudinal axis (YY') of the rack (that is to say to the slide axis of the rack).

Moreover, the tappet 10 will preferably have a shape, or at least an envelope, which is substantially cylindrical, where appropriate a cylindrical revolution shape, whose generator axis (central axis) will be substantially coincident, at normal operation, with the thrust axis (ZZ'), to which said generator axis may therefore be assimilated for convenience.

Conventionally and for convenience of description, and unless stated otherwise, « axial » will designate a direction or a dimension considered parallel to the considered axis, or coincident with the considered axis, and more particularly a direction parallel to or coincident with the thrust axis (ZZ').

Similarly, « radial » will designate a direction or a dimension considered transversely to the considered axis, and more particularly perpendicular to the considered axis, and in particular a direction substantially perpendicular to the thrust axis (ZZ').

As illustrated in FIG. 3, the casing 15, 16 comprises a jacket 15 which extends substantially according to the thrust axis (ZZ') from an access aperture 17 opening onto the rack 2.

The tappet 10 slides axially within said jacket 15.

The casing 15, 16 also comprises a yoke 16 which is attached and fastened (for example by screwing) on said jacket 15 so as to obstruct said jacket 15 opposite the access aperture 17.

Preferably, regardless furthermore of the arrangement of the device 1, the yoke 16 is formed, preferably integrally, in a (rigid) polymer material.

The polymer material will be chosen sufficiently rigid, possibly reinforced with fibers, and preferably among the thermoplastics capable of being molded by injection. As an indication, it will be possible in particular to use PA46 (polyamide) or PPA (polyphtalamide), possibly reinforced with glass or carbon fibers.

Advantageously, the implementation of a polymer-made yoke 16 will allow lightening the device 1, simplifying the manufacture of the yoke 16, and will help to avoid the occurrence of « metallic » noises relating to the vibrations and to the possible impacts between the parts within said device 11.

That being so, it is also possible to alternatively consider a yoke 16 formed of a metallic material.

In turn, the jacket 15 will preferably have a shape substantially matching that of the tappet 10, preferably a cylindrical shape with a substantially circular base, centered on the thrust axis (ZZ').

According to a possible embodiment, the jacket 15 (that is to say the portion of the casing 15, 16 corresponding to the jacket 15), may advantageously be integral with all or part of the steering case 4 which supports and guides the rack 2.

According to another possible embodiment, the jacket 15, and more generally the casing 15, 16 in its entirety, may form a subassembly distinct from the steering case 4, and which will be attached and secured on said steering case 4.

Regardless of its arrangement, the jacket 15 may advantageously be made of a metallic material, such as an aluminum alloy.

Moreover, according to a possible arrangement, which is illustrated in the alignment of the explosion axis in the exploded views of FIGS. 1 and 2, the tappet 10 may include, protruding from its lateral surface, lugs 18 intended to cooperate with mating axial slots, drilled in the inner wall 15l of the jacket 15, in order to mark the angular position of the tappet 10 and to block the rotation of said tappet about the thrust axis (ZZ'). Such an arrangement may also help to simplify the mounting of the tappet 10 in the jacket 15.

Nonetheless, according to a preferred variant, the tappet 10 is devoid of lugs 18 and will thus have, herein in its upper portion, said « head portion 10A », directly facing the jacket 15, a circular and smooth outer lateral surface, with a constant radius over its entire periphery about the thrust axis (ZZ'), as represented laterally offset from the explosion axis in FIGS. 1 and 2.

According to the invention, the clearance compensation device 1 also comprises an elastic damping member 20, which is interposed between the tappet 10 and the casing 15, 16, bearing respectively against a first bearing surface 21 belonging to the tappet 10 and a second bearing surface 22 belonging to the casing 15, 16.

Preferably, the elastic damping member 20 is formed by a ring made of elastomer, in particular to minimize the cost.

Said elastomer-made ring may have different shapes without departing from the scope of the invention, for example a shape substantially matching either one of the first and second bearing surfaces 21, 22.

According to a possible embodiment (not represented), the elastic damping member 20 may be formed by a frusto-conical flat seal, that is to say generated by revolution, about the thrust axis (ZZ'), of a substantially rectangular section, with a substantially constant thickness, and inclined with respect to the thrust axis (ZZ').

In particular, such a frusto-conical seal will be particularly suitable when either of the first and second bearing surfaces 21, 22 is in turn frusto-conical, so that the frusto-conical seal will conform in the flattened manner, by its radially inner face and/or, where appropriate, by its radially outer face, to said first bearing surface 21, respectively said second bearing surface 22.

In particular, such an arrangement will enable a self-centering of the frusto-conical seal with respect to the first, respectively the second, bearing surface 21, 22, and will provide a particularly stable bearing of said frusto-conical seal on said bearing surface(s) 21, 22.

The flat frusto-conical seal may be manufactured by molding.

Nonetheless, according to a particularly preferred variant, the elastic damping member 20 is formed by a ring made of elastomer with a circular cross-section, and more particularly by an O-ring seal, as illustrated in particular in FIGS. 1 to 7.

Hence, for convenience of description, it is possible to assimilate the damping member 20 to an O-ring seal 20 in the following, while considering that the description can be generalized and transposed, mutatis mutandis, to other forms of damping members 20.

Advantageously, such an O-ring seal 20 is particularly cheap and simple to implement.

As example, regardless of its shape (toroidal, flat frusto-conical, etc.), the damping member 20 may be made of polyurethane, silicone, rubber, and in particular NBR or HNBR rubber.

Moreover, the elastomer constitutive of the damping member 20 will preferably have a Shore hardness A comprised between 60 and 100.

Furthermore, said damping member 20 will be preferably centered on the thrust axis (ZZ'), coaxially with the tappet 10, the yoke 16 and the jacket 15. Thus, the action of the damping member 20 will be multidirectional, well distributed and balanced about the thrust axis (ZZ').

Advantageously, the internal perimeter of the damping member 20 will conform to the first bearing surface 21, so that the damping member 20 (and more particularly the O-ring seal) surrounds the tappet 10 (by 360 degrees), as illustrated in FIG. 4, whereas the external perimeter of said damping member 20 conforms to the second bearing surface 22.

In this regard, it should be noted that, in FIG. 4, the O-ring seal 20 is represented by a dotted line as it lies when it is stress-free, before deformation, and by a solid line when it is crushed and contained between the bearing surfaces 21, 22, once said O-ring seal 20 has been mounted within the device 1 and when it is sandwiched between the tappet 10 and the casing 15, 16.

Moreover, it should be noted that the clearance compensation device 1 preferably comprises a primary return member 25, such as a helical spring, which is distinct from the damping member 20 and which axially stresses the tappet 10 against the rack 2, so as to return the rack 2 against the pinion 7.

To this end, said primary return member 25 will be preferably interposed axially between the tappet 10 and the yoke 16, and axially pre-stressed in compression, so as to support the tappet 10, and consequently the rack 2, according to a return force which increases when the tappet is depressed (recoils axially) toward the yoke 16.

Preferably, the action of said primary return member 25 will be mainly, and even exclusively, axial.

The intensity of the return force exerted specifically by the primary return member 25 will preferably increase in a substantially proportional manner with the recoil of the tappet (because the stiffness of the helical spring 25 is substantially constant over the considered deformation range).

Axially, the damping member 20 in turn will preferably form an additional secondary return member which will have an auxiliary axial action completing the return action exerted by the primary return member 25.

In particular, the addition of the damping member 20 on top of the primary return member 25 will allow obtaining, by the axial compression of said damping member 20, an increasing axial stiffness, which will increase, preferably in a nonlinear manner, as the tappet 10 recoils.

Thus, the more the tappet 10 recoils, the more the combined action of the primary 25 and secondary 20 return members will be «tough», such that the intensity of the cumulated axial return action of the primary return member 25 and of the secondary return member 20, that is to say the intensity of the axial component of the thrust force $F_{thrust}$, will increase as the tappet 10 recoils, not in a proportional (linear) manner, but rather in an «over-proportional» manner, that is to say following a nonlinear function, whose slope increases with the recoil of the tappet 10.

As an indication, the axial stiffness of the system combining the primary return member 25 and the damping member 20 may be in the order of 700 N/mm to 1000 N/mm.

In this manner, the axial component of the thrust force $F_{thrust}$ thus sent back on the rack may reach about 300 N.

In contrast, the lateral blocking of the tappet 10 will be preferably completely attributed to the damping member 20.

To this end, the damping member 20 will be interposed radially between the tappet 10 and the casing 15, 16, so as to be able to exert (in addition to the axial action) a radial return action on the tappet 10.

It should be noted that the damping member 20 will be therefore preferably interposed both axially and radially between the tappet 10 and the casing 15, 16, conversely to the main return member 25 which is preferably interposed only axially, but not radially, between the tappet 10 and the casing 15, 16.

More generally, the damping member 20 will preferably form the unique impact-resistant element (made of elastomer) of the clearance compensation device 1, that is to say the only impact-resistant element which will be interposed radially between the tappet 10 and the casing 15, 16 and which will be elastically compressible radially, so that said impact-resistant element will be able to block the radial displacements of the tappet 10 relative to the casing 15, 16, by elastically dampening said radial displacements (by radial compression), and will therefore be able to prevent the tappet 10 (and more particularly the side wall of said tappet) from laterally hitting the casing 15, 16.

According to the invention, at least one of the first bearing surface 21 and second bearing surface 22, called «distribution surface» 23, is inclined with respect to the thrust axis (ZZ').

Furthermore, the other of said first and second bearing surfaces 21, 22, called «seat surface» 24, has, facing the distribution surface 23 and against the elastic damping member 20, at least one radial extension component 24R, which allows said seat surface 24 to act axially on the damping member 20, and at least one axial extension component 24A, which allows said seat surface to act radially on the damping member 20.

In this manner, when the tappet 10 compresses the elastic damping member 20 against the casing 15, 16, the elastic damping member 20 exerts, in response on the tappet 10, a retaining force $R_{20/10}$ which tends to return simultaneously said tappet 10 axially in the direction of the rack 2, on the one hand, and transversely (radially) in the direction of the thrust axis (ZZ'), on the other hand, as illustrated in particular in FIGS. 3 to 5.

It should be noted that the proposed arrangement for the distribution surface 23 and/or for the seat surface 24, and in particular the inclination of the distribution surface 23, can be observed at least in a plane P0 called «frontal plane» which is normal to the longitudinal axis (YY') of the rack 2 and which contains the thrust axis (ZZ').

Moreover, said frontal plane P0 preferably corresponds to a (first) plane of symmetry of the tappet 10, which divides said tappet into two substantially identical halves.

Preferably, the proposed arrangement for the distribution surface 23 and/or for the seat surface 24, and in particular the inclination of the distribution surface 23, can also be observed in several other directions considered in azimuth (in yaw) about the thrust axis (ZZ'), and more preferably over most of the azimuthal directions, that is to say that the damping member 20 and the bearing surfaces 21, 22 occupy a cumulated angular sector of more than 180 degrees, and even of more than 270 degrees, around the thrust axis (ZZ').

In a particularly preferred manner, such an arrangement can even be observed on all azimuthal directions (for example in the case of an O-ring seal mentioned hereinabove), the damping member 20 and the bearing surfaces 21, 22 then extend over 360 degrees about said thrust axis (ZZ').

Thus, it is possible to effectively distribute and balance the retaining force $R_{20/10}$ regardless of the action $F_{2/10}$ of the rack 2 on the tappet 10.

Moreover, regardless of their azimuthal extent, the damping member 20 and the bearing surfaces 21, 22 preferably have a symmetry with respect to the plane called « sagittal plane » P1 of the rack, which contains the longitudinal axis (YY') of the rack 2 and the thrust axis (ZZ'), and which is therefore perpendicular to the frontal plane P0.

More particularly, the damping member 20 and the bearing surfaces 21, 22 may have a symmetry of revolution with respect to the thrust axis (ZZ').

A symmetrical arrangement, on either side of the sagittal plane P1, allows in particular to obtain a symmetrical return behavior of the tappet 10 by the damping member 20, so that said damping member 20 tends to re-center the tappet 10 toward the thrust axis (ZZ'), regardless of the direction in which the tappet 10 tends to depart from the thrust axis (ZZ') under the action of the rack 2.

Thus, as example, when the tappet 10 is deviated to the right by the action of the rack, as illustrated in FIGS. 3 and 6, the damping member 20 returns said tappet 10 to the left, and vice versa.

Moreover, according to a possible configuration, it is the first bearing surface 21 which may form the seat surface 24, that is to say the seat surface 24 will be part of the tappet 10, whereas the second bearing surface 22, belonging to the casing, and more particularly to the yoke 16, will form the inclined distribution surface 23, as illustrated in FIG. 18.

Nonetheless, according to a preferred configuration, inverted in comparison with the previous one, and which corresponds in particular to that of FIGS. 3, 4, 16, 17 and 19, the first bearing surface 21 which belongs to the tappet 10 forms the inclined distribution surface 23, whereas the second bearing surface 22 which belongs to the casing 15, 16 forms the seat surface 24.

In other words, the distribution surface 23 is preferably made on the tappet 10, whereas the seat surface 24 is made on the casing 15, 16, and more preferably, at least partially, and even entirely, on the yoke 16.

In particular, such a configuration may facilitate the manufacture of the tappet 10 and of the yoke 16, and then the assembly of these elements with the damping member 20.

In the following, it is therefore possible to assimilate, for convenience of description, and unless otherwise specified, the distribution surface 23 to the first bearing surface 21 belonging to the tappet 10, and the seat surface 24 to the second bearing surface 22 belonging to the casing 15, 16, without constituting however a restriction of the invention, since said invention actually applies to any inverted configuration, whose characteristics would be deduced mutatis mutandis.

FIGS. 16 to 19 illustrate, in a non-limiting manner, different possible configurations of the bearing surfaces 21, 22, and more generally of the damping interface formed between the tappet 10 and the casing 15, 16 through the damping member 20.

FIG. 16 illustrates a variant within which both the first bearing surface 21 and the second bearing surface 22 are frusto-conical, with substantially mating shapes, centered on the thrust axis (ZZ') and orientated in the same direction, so as to be able to be substantially nested through a cone/cone type bearing.

In absolute terms, according to this configuration illustrated in FIG. 16, each of the bearing surfaces 21, 22 may fill both the role of a distribution surface 23, thanks to its inclination with respect to the thrust axis (ZZ'), and of a seat surface 24, the axial component 24A, L23 of the inclined bearing surface 21, 22 forming a radially retaining stop against the damping member 20 and, respectively, the radial component 24R, H23, of this same inclined bearing surface 21, 22 forming an axially retaining stop against said damping member 20.

In other words, in this configuration where the first and second bearing surfaces 21, 22 are substantially parallel to each other and inclined, the roles of a distribution surface 23 and of a seat surface 24 assigned to said first and second bearing surfaces 21, 22 are interchangeable.

In particular, an advantage of this configuration of FIG. 16 is in particular that it facilitates the centering of the tappet 10 with respect to the yoke 16 during the mounting.

In contrast, this same configuration has the drawback of not offering a stable holding of the damping member 20 during the mounting operations.

FIG. 17 illustrates a variant within which the inclined distribution surface 23 is formed by the first bearing surface 21, which is herein frusto-conical and centered on the thrust axis, and whose fictional apex points in the direction of the yoke 16, whereas the seat surface 24 is formed by the second bearing surface 22, which is in the form of an annular shoulder, drilled in the yoke 16.

This configuration, which corresponds in addition to that illustrated in FIGS. 1 to 4, offers in particular a very stable holding, which is both axial and radial, of the damping member 20 placed in the yoke 16 inside the shoulder, and this during the mounting operations as well as during the operation of the device 1.

FIG. 18 illustrates a variant within which, in contrast to the previous variant, the inclined distribution surface 23 is formed by the second bearing surface 22, which is herein frusto-conical and centered on the thrust axis (ZZ'), drilled in the yoke 16, and whose fictional apex points in the direction of the yoke 16, whereas the seat surface 24 is formed by the first bearing surface 21, which is in the form of an annular shoulder, drilled in the tappet 10.

Herein again, a very stable holding of the damping member 20 tightened around the tappet, inside the shoulder, is obtained, and this during the mounting operations as well as during the operation of the device 1.

For convenience of description, when the seat surface 24 is formed by a shoulder, it is possible to assimilate said shoulder to said seat surface 24 and refer to said shoulder by the same reference numeral 24 as the seat surface.

FIG. 19 illustrates a further variant, within which the seat surface 24 is formed by a slot 40, preferably annular, and with a semi-circular cross-section, which is centered on the thrust axis (ZZ'), and which opens onto a face, preferably substantially perpendicular to the thrust axis (ZZ'), which faces a corresponding frusto-conical distribution surface 23, centered on the thrust axis (ZZ').

In FIG. 19, the slot 40 is drilled in the yoke 16 and opens onto an upper face of said yoke 16, which is substantially perpendicular to the thrust axis (ZZ') and which faces a frusto-conical distribution surface 23 which is formed herein by the first bearing surface 21 belonging to the tappet 10.

Preferably, the diameter of the semi-circular cross-section of the slot 40 is substantially equal to, or very slightly larger than, the diameter D20 of the cross-section (at rest, before deformation) of the damping member 20, so as to be able to accommodate a significant portion, herein axially at least the half, of the damping member 20.

Such a configuration allows setting the damping member 20 in a relatively stable manner in the slot 40 during the mounting, but does not allow however a holding of said damping member 20 as effective as in the variants of FIGS. 17 and 18, to the extent that said damping member is then simply set, and not, unlike the two previous variants, tightened by constriction on the tappet 10 (FIG. 18) or in the yoke 16 (FIG. 17).

Other specificities and advantages of these different variants will be described in more detail in the following.

Advantageously, according to each azimuthal direction considered around the thrust axis (ZZ'), the inclination of the distribution surface 23 according to the invention allows, by means of only one bearing surface (the first bearing surface 21 in FIGS. 3, 4, 16, 17, 19, and the second bearing surface 22 in FIG. 18), distributing the effect of the action $F_{2/10}$ exerted by the rack 2 on the tappet 10, and consequently distributing the reaction of the damping member 20 (that is to say the retaining force $R_{20/10}$), simultaneously according to two components of the retaining force, namely, as illustrated in FIG. 5:

- a first axial retaining force component $R_{20/10\_A}$, which tends to push the tappet 10 axially, that is to say substantially parallel to the thrust axis (ZZ') (and herein upward), against the rack 2 (so as to press the teeth 2T, transverse to the thrust axis (ZZ'), against the drive pinion 7), said first axial retaining force component $R_{20/10\_A}$ being generated by the axial elastic pinching of the damping member 20 between the distribution surface 23, on the one hand, and the radial extension component 24R of the seat surface 24, on the other hand (said radial extension component 24R forming a stop which opposes the axial displacement of the damping member 20), and
- a second radial retaining force component $R_{20/10\_R}$, which tends to push the tappet 10 radially toward the thrust axis (ZZ'), according to a direction substantially perpendicular to said thrust axis (ZZ'), said second radial retaining force component $R_{20/10\_R}$ being generated by the radial elastic pinching of this same damping member 20 between this same distribution surface 23, on the one hand, and the axial extension component 24A of the seat surface 24, on the other hand (said axial extension component 24A forming a stop which opposes the radial displacement of the damping member 20).

Thus, the same damping member 20 acts, in contact with the inclined distribution surface 23, at the interface between the tappet 10 and the casing 15, 16, both as an axial damping spring and as a radial damping spring.

Thus, the invention promotes, when needed, the oblique return of the retaining force $R_{20/10}$, which may therefore converge both (axially) toward the rack 2 and (radially) toward the thrust axis (ZZ'), which ensures a particularly effective and stable bidirectional (radial and axial) holding of the tappet 10, by means of a structure which is however relatively simple.

In particular, the retaining force $R_{20/10}$ may thus point obliquely substantially toward the longitudinal axis (YY') of the rack 2, that is to say in this instance toward the center $O_{13}$ of the circular arc-shaped course defining the sliding surface 13 of said rack 2.

Generally, the arrangement of the bearing surfaces 21, 22 will be preferably substantially in the form of a basin, or of a funnel, whose large opening is turned toward the rack 2 and which evolves tightening, that is to say coming radially close to the thrust axis (ZZ'), as moving axially away from the rack 2 (and from the pinion 7) according to said thrust axis (ZZ').

Thus, the arrangement of the bearing surfaces 21, 22 will tend to dive inside the perimeter radially delimited by the damping member 20.

Similarly, in order to ensure a holding in position of the damping member 20 in spite of the oblique loads experienced by said damping member, the second bearing surface 22, and more particularly the axial extension component 24A of the seat surface 24, will be radially offset outwardly with respect to the first bearing surface 21, and more particularly with respect to the inclined distribution surface 23, that is to say that it will be farther from the thrust axis (ZZ') than said first bearing surface 21.

More generally, on the same side of the thrust axis (ZZ'), the first bearing surface 21, the neutral fiber $O_{20}$ of the damping member 20, and the second bearing surface 22 will advantageously be stepped both axially (by increasing distance from the rack 2 and from the pinion 7) and radially (by an increasing radius) in this order, relative to each other.

By « neutral fiber » $O_{20}$, is meant, within the usual meaning of the beam theory, the generator line of the damping member 20 which is formed by all the centers of gravity of each one of the cross-sections whose succession constitutes said damping member 20 about the thrust axis (ZZ'). For convenience of notation, it will be therefore possible, in the following, to designate by the reference $O_{20}$ both the « neutral fiber » of the damping member 20 and the « center of gravity » of one of the cross-sections of the damping member 20 corresponding to said neutral fiber in said cross-section.

In a particularly preferred manner, the distribution surface 23 forms a truncated cone which is centered on the thrust axis (ZZ'), and more particularly on the generator axis of the tappet 10, and whose apex S23 points, as illustrated in FIGS. 3, 4, 16, 17, 18 and 19, in the direction of the axial recoil of the tappet 10, that is to say opposite the rack 2, and in particular opposite the rack 2 and the pinion 7 with respect to a plane called « gauge plane » $P_J$ which is normal to the thrust axis (ZZ') and which contains the neutral fiber $O_{20}$ of the damping member 20.

In particular, such a frusto-conical arrangement allows easily shaping (for example by machining or by molding) a relatively extended distribution surface 23, well adapted to accommodate and use an O-ring seal 20, and which has the effect of distributing the forces in all azimuthal directions about the thrust axis (ZZ'), thereby helping to balance the tappet 10 and to damp the travel of said tappet regardless of the orientation of the loads exerted by the rack on said tappet 10.

For convenience of description, when the distribution surface 23 is formed by a truncated cone, it is possible to assimilate said truncated cone to said distribution surface 23 and refer to said truncated cone by the same reference numeral 23 as the distribution surface.

Preferably, in particular for convenience of manufacture, and in particular in order to simplify the metrological control of the dimensions of the tappet 10, or respectively of the yoke 16, in which is arranged the distribution surface 23, the side wall of the truncated cone forming the distribution surface 23 is substantially rectilinear, as illustrated in FIGS. 4 and 16 to 19.

That being so, it is not excluded that said wall of the truncated cone 23 could, alternatively, have a slightly convex camber, or a slightly concave incurvation.

Preferably, as shown in particular in FIGS. 3 and 4, the angle of inclination $\theta_{23}$ of the distribution surface 23 with respect to the thrust axis (ZZ'), that is to say herein more particularly the half-angle at the apex of the truncated cone 23, is comprised between 30 degrees and 60 degrees, and preferably substantially equal to 45 degrees, and even substantially equal to 55 degrees.

Advantageously, the choice of such an inclination $\theta_{23}$ confers to the distribution surface 23 a good transmission capacity of the forces, both axially and radially, and consequently a good interaction and retaining capacity, both axially and radially, against the damping member 20.

Hence, in the end, such an inclination allows obtaining a proper distribution of the axial $R_{20/10\_A}$ and radial $R_{20/10\_R}$ components of the retaining force $R_{20/10}$, and thus ensures the anti-tilt balancing of the tappet 10.

In this respect, it should be noted that, in order to avoid a too significant radial dispersion, that is to say in order to avoid that a (mainly) axial force exerted by the rack 2 on the tappet 10 causes, by conversion of said force through the distribution surface 23 (by a spacer wedge effect), a too significant radial action on the device 1, we will avoid inclining the distribution surface 23 too « vertically », and we will therefore favor an angle of inclination $\theta_{23}$ as great as possible, and in particular strictly greater than 45 degrees, for example close to 55 degrees.

As an indication, the distribution surface 23 (and more particularly the rectilinear and inclined portion of said distribution surface, intended to be in contact with the damping member 20) may extend radially over a width L23 equal to or larger than 50%, 60%, and even 75% of the diameter (at rest) D20 of the cross-section of the O-ring seal 20, and/or comprised between 2 mm and 3 mm, and even 5 mm.

Similarly, as an indication, the distribution surface 23 (and more particularly the rectilinear and inclined portion of said distribution surface, intended to be in contact with the damping member 20) may extend axially over a height H23 equal to or larger than 50%, 60%, and even 75% of the diameter (at rest) D20 of the cross-section of the O-ring seal 20, and/or comprised between 2 mm and 3 mm, and even 5 mm.

Advantageously, such preferred dimensions will procure an extent of the distribution surface 23 which will be sufficient to ensure a good seating to the damping member 20, as well as an effective transmission of the forces, and to enable the free functional deformation of said damping member 20.

Moreover, it should be noted that the arrangement of the seat surface 24 may vary, provided that said seat surface has both an axial extension component 24A and a radial extension component 24R, that is to say it extends, in its entirety, both radially and axially (and not exclusively radially or exclusively axially), so as to be able to form, on the one hand, by its axial extension component 24A, a radial stop which allows opposing to the damping member 20 a radial force component, and substantially blocking the radial displacement of said damping member 20 (transversely to the thrust axis (ZZ')) and, on the other hand, by its radial extension component 24R, an axial stop which allows opposing to the damping member 20 an axial force component, and therefore substantially blocking the axial displacement of said damping member 20, as schematized in FIG. 5.

In absolute terms, it would be thus possible to consider forming a continuously slanted seat surface 24, for example substantially frusto-conical or incurved, the inclination of the surface with respect to the thrust axis (ZZ') conferring simultaneously both necessary extension components 24A, 24R thereto.

An example of a variant with a frusto-conical seat surface 24 is represented in FIG. 16, within which both the distribution surface 23 and the seat surface 24 have frusto-conical substantially mating shapes nested together, so that the radial extension component 24R corresponds to the radial extent of the slope which forms the truncated cone 24, and the axial extension component 24A corresponds to the axial extent of this same slope of the truncated cone 24.

It should be noted that, when the seat surface 24 is (also) frusto-conical, the radial 24R and axial 24A extension dimensions thereof may comply with the same sizing rules as those mentioned hereinabove in connection with the radial width L23 and the axial height H23 respectively of the distribution surface 23.

According to a possible embodiment, it is possible to choose a sizing such that we have substantially (in a length measurement): 24R=L23, and 24A=H23, provided that the distribution 23 and seat 24 surfaces have an axial overlap, and a radial overlap, sufficient to interpose the damping member 20 therebetween.

An example of a variant having this time a seat surface 24 with a curved shape is represented in FIG. 19, within which the seat surface 24 is formed by an (annular) slot 40 with a semi-circular section, centered on the thrust axis (ZZ').

The radial extension component 24R then substantially corresponds to the diameter of the section of said slot 40, that is to say to the dimension of the bottom of said slot 40 projected axially on a radial axis perpendicular to the thrust axis (ZZ'), whereas the axial extension component 24A substantially corresponds to the radius of the section of said slot 40, that is to say to the depth of said slot 40 projected radially on the thrust axis (ZZ').

Nonetheless, in a particularly preferred manner, the radial extension component 24R and the axial extension component 24A of the seat surface 24 are formed respectively, as shown in particular in FIGS. 4, 17 and 18, by a first surface portion 24R and a second surface portion 24A which are secant to each other, so that the seat surface 24 forms a shoulder.

In other words, it is preferred to split the seat surface 24 into two secant seat sub-surfaces 24R, 24A, which preferably meet by forming a broken line at the level of a « fold » 26 which marks an orientation break, so that each one of said sub-surfaces 24R, 24A extends essentially and even exclusively according to an (axial or radial) direction distinct from the direction of extension of the other sub-surface 24A, 24R.

It is in particular the case of the variant illustrated in FIG. 17, within which the shoulder formed by the seat surface 24 is drilled in the casing, and more particularly in the yoke 16 (which is also the case in FIGS. 1 to 4), or the case of the variant illustrated in FIG. 18, within which the shoulder formed by the seat surface 24 is in this instance drilled in the tappet 10.

Thus, the first surface portion 24R (first seat sub-surface) will preferably extend mainly radially, and even exclusively radially, that is to say perpendicularly to the thrust axis (ZZ'), according to a plane normal to said thrust axis (ZZ'), whereas the second surface portion 24A (second seat sub-surface) will preferably extend mainly axially, and even exclusively axially, that is to say parallel to the thrust axis (ZZ'), herein according to a cylinder, preferably with a circular base, centered on and generated by said rectilinear thrust axis (ZZ').

Advantageously, arranging the surface portions 24R, 24A according to a shoulder 24 allows housing and maintaining effectively the damping member 20 at the bottom of said shoulder, as said damping member 20 is bordered, both axially and radially, by very clearly marked stops.

In particular, such a bidirectional holding is useful during the assembly of the device 1, because it is thus advantageously possible to fit the damping member 20, and more particularly the O-ring seal 20, into the shoulder 24, in which said O-ring seal 20 bears, held by constriction and friction, before engaging the yoke 16 facing the tappet 10.

Thus, in the variant of FIG. 17, and of FIGS. 1 to 4, the damping member 20 may be fitted and tightened beforehand, by centripetal compression exerted on the external diameter of said damping member 20, inside the shoulder 24 drilled in the yoke 16, before said yoke 16 is engaged and screwed into the jacket 15.

In the variant of FIG. 18, the damping member 20 may be fitted beforehand around the tappet 10, in the shoulder 24 drilled in the latter, and maintained tightened, by the centrifugal extension exerted on the internal diameter of said damping member 20, against said tappet 10 while engaging said tappet into the jacket 15.

This avoids that, during the manipulations of the yoke 16 and/or of the tappet 10 necessary to the assembly, said O-ring seal 20 drops or slides with the risk of being placed sideways, of being pinched or damaged.

Such a stable and robust bidirectional holding by shoulder 24 is also valuable in operation, since it prevents the damping member 20, and more particularly the O-ring seal 20, from escaping or being dislodged when said O-ring seal 20 is compressed between the tappet 10 and the casing 15, 16, and since it allows transmitting via said O-ring seal 20 large retaining force components ($R_{20/10\_A}$ and $R_{20/10\_R}$) in both axial and radial directions.

It should be noted that, preferably, in particular for convenience of manufacture and to optimize the effectiveness of the bidirectional holding by shoulder 24, the first portion of the seat surface 24R and the second portion of the seat surface 24A intersect substantially at a right angle, as illustrated in FIGS. 4, 17 and 18.

Moreover, the casing 15, 16 comprising a jacket 15 as well as a yoke 16, distinct from the jacket, and which is added and fastened on said jacket 15 so as to obturate said jacket opposite the access aperture 17, as described hereinabove, both the radial 24R and axial 24A extension components of the seat surface 24 are preferably formed by portions of the yoke 16.

In other words, the seat surface 24, and more particularly the shoulder 24, is preferably completely cut in the yoke 16 (without extending to the jacket 15).

More particularly, the radial extension component 24R of the seat surface 24 is preferably formed by the bottom wall (herein planar, and substantially perpendicular to the thrust axis (ZZ')) of a counterbore 27 which is drilled (axially) in said yoke 16 and centered on the thrust axis (ZZ'), whereas, respectively, the axial extension component 24A of said seat surface 24 is formed by the side wall (herein cylindrical and substantially parallel to the thrust axis (ZZ')) of this same counterbore 27 which is drilled in said yoke and centered on the thrust axis (ZZ').

In the first place, such an arrangement allows a simple and rapid shaping, either by molding, or by machining (through one single counterboring operation), of the seat surface 24.

Furthermore, by forming the seat surface 24 integrally in the yoke 16, a robust and stable structure is obtained, which allows, during the assembly of the device 1, to position directly and accurately the damping member 20 at its final functional location at the contact of said seat surface 24, within the yoke 16, before adding said yoke 16 against the tappet 10 and on the jacket 15.

This same monolithic structure of the seat surface 24 afterwards allows a solid holding of the damping member 20 during the operation of the device 1.

Finally, and above all, the arrangement of the two (axial 24A and radial 24R) components of the seat surface 24 within the yoke 16 allows, according to a feature which may constitute an invention on its own, interposing radially the yoke 16 (besides preferably made of a polymer material, and added on the jacket 15) between, on the one hand, the (radially outer) side wall of the tappet 10, and more particularly the distribution surface 23 belonging to said tappet 10 and, on the other hand, the inner wall 15*l* of the (preferably metallic) jacket 15, so that the yoke 16 itself forms an impact-resistant barrier, which limits the radial travel of the tappet 10 and prevents said tappet 10 from hitting directly, and generally from coming into contact with, the jacket 15.

More particularly, the invention therefore allows interposing radially, between the side wall of the tappet 10 and the inner wall 15*l* of the jacket 15, an (annular) yoke portion 16, centered on the thrust axis (ZZ'), and which surrounds the tappet 10 all around said thrust axis (ZZ').

Similarly, the damping member 20 may thus be interposed between the side wall of the tappet 10, and more particularly the distribution surface 23 of said tappet, and said annular yoke portion 16.

The annular yoke portion 16 interposed between the tappet 10 and the jacket 15 will thus form (at least) the axial extension component 24A of the seat surface, which receives and blocks, according to the centrifugal radial direction, the elastomer-made damping member 20 on which bears (at least according to said centrifugal radial direction) the side wall of the tappet 10.

Because of this tappet 10/damping member 20/yoke 16 concentric stack, the tappet 10 is advantageously elastically suspended against (and within) the yoke 16, according to the radial direction, away from the inner wall of the jacket 15.

Furthermore, the preferred use of a yoke 16 made of a polymer material allows alleviating the noise caused by a possible impact of the tappet 10, to the extent that such an impact then occurs against said plastic-made yoke 16, herein against the aforementioned annular portion of the yoke 16 which axially overlaps the tappet 10 (and more particularly which overlaps the foot portion 10B of said tappet), rather than against a metallic portion of the device 1, such as the jacket 15, which favorably modifies the sonority (the «timbre») of said impact.

Besides, it should be noted that the yoke 16 may advantageously, by its aforementioned annular portion, axially overlap the tappet 10 over at least one portion of the total axial height H10 of said tappet 10, not only opposite the first bearing surface 21, but also beyond, over an entire terminal portion, herein the lower portion, called « foot portion 10B » of said tappet 10, as will be detailed later on.

Preferably, as mentioned hereinabove, the rack 2 has a longitudinal axis (YY'), according to which it slides relative to the tappet 10, and has, in a section transverse to its longitudinal axis (YY'), a sliding surface 13 which is generated substantially according to an arc of circle and which cooperates in sliding support on a corresponding receiving surface 14 provided in the tappet 10.

Preferably, at least in the section plane called « frontal plane » P0, substantially perpendicular to the longitudinal axis (YY') of the rack 2 and containing the thrust axis (ZZ'), the fictional line, called « tilt boundary » $L_T$, which passes through the center $O_{13}$ of the arc of circle generating the sliding surface 13, on the one hand, and through the center (center of gravity) $O_{20}$ of the cross-section of the damping member 20, on the other hand (that is to say through the neutral fiber $O_{20}$ of said damping member 20), has, with respect to the thrust axis (ZZ'), and as shown in FIGS. 3 and 4, an opening angle, called « seat angle » $\theta_{LT}$, which is equal to or larger than 20 degrees, and smaller than or equal to 40 degrees, and more preferably comprised between 20 degrees and 35 degrees.

According to a possible embodiment, said seat angle $\theta_{LT}$ will be chosen so as to be substantially equal to 35 degrees.

Advantageously, it will be understood that, as illustrated in FIG. 6, as long as the action $F_{2/10}$ of the rack 2 on the tappet 10 is contained within the angular sector comprised between the thrust axis (ZZ') and the tilt boundary $L_T$, that is to say as long as said action $F_{2/10}$ of the rack 2 on the tappet 10 points toward the inside of the defined closed perimeter, about the thrust axis (ZZ'), by the neutral fiber $O_{20}$ of the damping member 20, then the moment of said action $F_{2/10}$ of the rack 2 on the tappet 10, created with respect to the neutral fiber $O_{20}$ of the damping member 20, will tend to return the tappet 10 toward the inside of the annular perimeter defined by said damping member 20.

In a similar situation, the action $F_{2/10}$ of the rack 2 on the tappet 10 will have the effect of self-balancing the tappet 10, within the yoke 16, by making said tappet 10 be carried on the entirety of the damping member 20, which will thus be compressed axially on either side (to the left as well as to the right, in FIGS. 3 and 6) of the thrust axis (ZZ').

The retaining force $R_{20/10}$, and more generally the resultant of the retaining forces exerted all around the thrust axis (ZZ'), along the contact crown according to which the distribution surface 23 bears on the damping member 20, may thus balance the action of the rack.

Hence, the tappet 10 is supported in a stable manner, without any risk of tilting.

Conversely, as illustrated in FIG. 7, it should be avoided that the action $F_{2/10}$ of the rack 2 on the tappet 10 could be exerted beyond the tilt boundary $L_T$, because this would create, with respect to the neutral fiber $O_{20}$ of the damping member 20, a moment which would tend to detach the tappet 10 from said damping member 20 on one side of the thrust axis (ZZ') (to the left in FIG. 7) and to make the tappet 10 tilt above the neutral fiber $O_{20}$, and therefore above the damping member 10, on the opposite side of the thrust axis (ZZ') (herein to the right in FIG. 7).

This is why the seat angle $\theta_{LT}$ will be chosen so as to have a sufficiently high minimum value (typically greater than or equal to 30 degrees, and even equal to 35 degrees), greater than the value which corresponds to the predictable angular sector of action $\theta_{2/10}$ of the rack 2 on the tappet 10.

As example, in FIG. 6, the seat angle $\theta_{LT}$ will therefore have to represent more than half the total angular sector occupied by the predictable sector of action $\theta_{2/10}$.

Moreover, the maximum value of said seat angle $\theta_{LT}$ will be chosen sufficiently low in order to limit the radial spreading of the damping member 20, and consequently the radial extent of the yoke 16, of the tappet 10, and more generally of the device 1, so as to preserve the compactness of said device 1.

Similarly, it will be preferred to limit the seat angle $\theta_{LT}$, so as to limit the intensity of the radial component of the action $F_{2/10}$ of the rack 2 on the tappet 10, as well as the contact pressure of the rack 2 on the pad 12.

This is why the value of said seat angle $\theta_{LT}$ will be preferably set to a value smaller than or equal to 40 degrees, and even preferably equal to or smaller than 35 degrees.

Moreover, it should be noted that, if the seat angle $\theta_{LT}$ has been defined with reference to the longitudinal axis (YY') of the rack, it could also be possible to define it mutadis mutandis with respect to the generator axis of the cradle 11 (by taking into consideration, where appropriate, the slight eccentricity of the rack 2 with respect to said generator axis of the cradle 11).

Similarly, it could be possible to define the seat angle $\theta_{LT}$ with reference to the center of the distribution surface 23 rather than with reference to the neutral fiber of the damping member 20.

Thus, for example, it could be possible to substantially dimension the tappet 10 by imposing that the angle formed between, on the one hand, the central axis (the generator axis) (ZZ') of said tappet 10 and, on the other hand, the fictional line which passes through the center of the distribution surface 23 of said tappet 10 and through the center of the longitudinal axis of the cradle 11 (or of the pad 12), which substantially corresponds to the longitudinal axis of the rack (YY'), namely equal to the aforementioned values of the seat angle $\theta_{LT}$.

Moreover, the casing 15, 16 comprising a jacket 15 as well as a yoke 16, distinct from the jacket 15, and which is added and fastened on said jacket 15 so as to obstruct said jacket opposite the access aperture 17, as described hereinabove, the tappet 10 preferably has, as illustrated in particular in FIGS. 3, 11 and 13, an axially-stepped structure which includes, on the one hand, a head portion 10A, with a shape substantially matching the shape of the inner wall 15I of the jacket 15 opposite which said tappet 10 slides and, on the other hand, a foot portion 10B, which axially prolongs the head portion 10A.

According to a preferred feature, which may even constitute an invention on its own independently of the presence and/or of the arrangement of the damping member 20, at least one portion of the tappet 10, in this instance the foot portion 10B of the tappet 10, penetrates into, and cooperates with, a guide bore 30 drilled in the yoke 16 (and herein centered on the thrust axis (ZZ')), so as to guide the tappet 10 in axial translation relative to said yoke 16.

The head portion 10A of the tappet 10 corresponds in practice to the portion of the tappet the closest to the rack 2, that is to say the (upper in FIG. 3) portion in which the cradle 11 is drilled, whereas the (lower in FIG. 3) foot portion 10 is the farthest from the rack 2.

The foot portion 10B will be preferably narrower than the head portion 10A, that is to say it will have a smaller diameter than the diameter of said head portion 10A, so as to form a constriction about the thrust axis (ZZ').

Furthermore, the diameter of the foot portion 10B will be preferably smaller than the (minimum) diameter of the damping member 20.

Preferably, the foot portion 10B may thus be inserted inside the perimeter of the damping member 20, and more particularly inside the perimeter defined by the neutral line $O_{20}$ of said damping member, and pass through the gauge plane $P_J$ to engage inside the bore 30 which ensures the guiding of said foot portion 10B.

Such an arrangement will allow simplifying the assembly of the device 1, and improving the stability of the tappet 10, bearing on the damping member 20.

Preferably, the foot portion 10B will substantially have a cylindrical shape with a circular base, arranged concentrically with the head portion 10A, that is to say centered on the generator axis (ZZ') of the tappet 10.

It should also be noted that, preferably, the inclined distribution surface 23 (preferably annular, and more particularly frusto-conical) forms the transition between the head portion 10A and the foot portion 10B of the tappet 10, as illustrated in particular in FIGS. 3, 4, 16, 17 and 19.

In the case of the variant illustrated in FIG. 18, it is the seat surface 24, forming a shoulder, which will coincide with the shoulder which marks the diameter transition between the head portion 10A and the foot portion 10B of the tappet 10.

Hence, in any case, it is possible, in particular for convenience of manufacture, to take advantage of the tightening between the head portion 10A and the foot portion 10B to create the distribution surface 23 or, respectively, the seat surface 24.

When the seat surface 24 is formed in the casing 15, 16, and more particularly in the yoke 16, the guide bore 30 will be preferably drilled from the bottom of the counterbore 27 forming the bidirectional seat surface 24 (the shoulder), so as to axially prolong the depth of said counterbore 27.

The bore 30 will be then preferably located, at the center of the yoke 16, coaxially with the counterbore 27, as shown in particular in FIGS. 3 and 4.

Thus, according to an arrangement both compact and easy to manufacture, the counterbore 27 forming the seat surface 24 may border and surround (completely) the mouth (herein at the top) of the guide bore 30.

The same may apply for the variants in which the seat surface 24 (FIG. 16) or even, where appropriate, the distribution surface 23 (FIG. 18), is formed by a frusto-conical recess in the yoke 16. The guide bore 30 may then be located in the axial extension of said truncated cone, said bore thus being connected to the small base of said truncated cone, and preferably having a diameter equal to that of said small base.

Thus, the guide bore 30 will have, facing the tappet, a flared mouth, formed as appropriate by the frusto-conical seat surface 24 or respectively, by the frusto-conical distribution surface 23.

It should be noted that, advantageously, the engagement of the foot portion 10B of the tappet into the bore 30 of the yoke 16 allows offering a considerable axial guide height to the tappet 10, and therefore reducing the lateral travel of the tappet as well as the risks of jamming by over-center, in particular during the mounting, while preserving generally a proper compactness of the device 1.

Moreover, the foot portion 10B of the tappet 10 is preferably provided with a tubular housing 31 which receives the primary return member (helical spring) 25.

Said tubular housing 31 is advantageously delimited by a partition wall 34, which is interposed radially between the primary return member 25, on the one hand, and the wall of the guide bore 30 and the damping member 20, on the other hand. Hence, it is the radially outer surface of said partition wall 34 which cooperates with the bore 30 to guide the tappet 10.

Such a hollow arrangement of the foot portion 10B advantageously allows housing in a restricted space several components carrying out different functions, among which the tappet 10, the primary return member 25, the damping member 20, the yoke 16, and the surfaces ensuring the guiding in translation of the tappet 10.

Moreover, as shown in particular in FIGS. 3, 13 and 15, the inclined distribution surface 23 is preferably prolonged by an annular disengagement groove 32, axially drilled in the head portion 10A (herein in the lower face of said head portion, and at the upper end of the distribution surface 23) so as to be able to accommodate at least partially the constitutive material of the elastic damping member 20 which flows back when said damping member 20 is deformed under the effect of the compression caused by the recoil of the tappet 10.

Said disengagement groove 32, which may accommodate the material of the damping member 20 when said material is expelled by compression, promotes the free elastic deformation of the damping member 20.

Hence, the increase of the stiffness of the device 1, as the tappet 10 recoils, will be particularly progressive, which will make the return of the tappet 10 against the rack 2 effective and fluid, smoothly, without any impact, nor any brutal increase of stiffness.

Furthermore, the freedom of deformation given to the damping member 20 by the disengagement groove 32 allows avoiding any permanent and irreversible plastic deformation of the damping member 20. Thus, the damping member 20 advantageously preserves over time its stiffness, and therefore its spring effect, in all the recoil ranges of the tappet 10.

Preferably, as illustrated in FIG. 4, the radial clearance $J_B$ (hereinafter « second radial clearance ») between the foot portion 10B of the tappet and the guide bore 30 of the yoke 16 is strictly smaller than the radial clearance $J_A$ (hereinafter « first radial clearance ») between the head portion 10A of the tappet and the inner wall 15l of the jacket 15.

Advantageously, it is therefore the yoke 16, surrounding the foot portion 10B of the tappet, which ensures the most accurate guiding of the tappet 10, and radially blocks the lateral travel of said tappet 10 (in its entirety, that is to say the travel of the foot portion 10B as well as that of the head portion 10A), so that no portion of said tappet 10 could reach the jacket 15 and enter directly into contact with the inner wall 15I of said jacket.

Herein again, it should be noted that, because the yoke 16 is added to the inside of the jacket 15 and because the tappet 10 itself penetrates at least partially inside said yoke 16 (herein by the foot portion 10B), the yoke 16 forms, by nesting, an anti-tilt and impact-resistant buffer, interposed radially between the tappet 10 and the jacket 15.

Furthermore, in particular thanks to the appropriate sizing of the first and second radial clearances $J_A$, $J_B$, it is the yoke 16, and not the jacket 15 which, where appropriate, takes up the potential impacts of the tappet 10 against the casing 15, 16.

Thus, even in the event of an impact, the latter will occur against the yoke made of a polymer material, and not against the metallic jacket, which allows avoiding a « metallic » sonority of said impact or a resonance of the noise of said impact, and thus makes the operation of the tappet 10 particularly silent, whatever happens.

Advantageously, choosing to operate the guiding of the tappet 10 at the level of the foot portion 10B, via the bore 30 of the yoke 16, rather than at the level of the head portion 10A, will allow high values of the first radial clearance $J_A$, and will therefore allow releasing the manufacturing tolerances regarding the head portion 10A of the tappet, and consequently reducing the manufacturing cost.

By providing for a relatively significant first radial clearance $J_A$, the engagement of the tappet 10 into the jacket 15 is furthermore facilitated, during the mounting, without any risk of jamming by over-center said tappet 10 against the inner wall 15I of the jacket 15.

Preferably, the second radial clearance $J_B$ between the foot portion 10B of the tappet and the guide bore 30 of the yoke 16 will be defined by radially protruding reliefs 33, such as corrugations.

In comparison with a smooth cylinder, such an arrangement with reliefs 33 will in particular allow obtaining a better accuracy on the diameter of the foot portion 10B, during the manufacture of the tappet 10 by injection molding.

More particularly, the use of reliefs 33 allows limiting, after assembly, the dispersion of the functional guide clearance, that is to say the dispersion of the second radial clearance $J_B$ between the tappet (the foot portion 10B of the tappet) and the wall of the guide bore 30 of the yoke 16.

In the end, it is therefore possible to manufacture a tappet 10 and a device 1 at a lower cost, still without compromising the guiding quality of the tappet 10.

As an indication, the first radial clearance $J_A$ (wide) between the head portion 10A of the tappet and the inner wall 15I of the jacket 15 may be substantially comprised between 500 μm (0.5 mm) and 1000 μm (1 mm), while the second radial clearance $J_B$ (more accurate) between the foot portion 10B of the tappet and the guide bore 30 may be substantially comprised between 150 μm and 400 μm (for typical respective diameters in the order of 32 mm to 40 mm for the head portion 10A, and 22 mm to 30 mm for the foot portion 10B).

The second radial clearance $J_B$ will advantageously allow obtaining a sliding adjustment, with a clearance, of the tappet 10 with respect to the yoke 16.

In this respect, it should be noted that the inclination, and more particularly the frusto-conical shape, of the distribution surface 23 provides a self-centering effect, as well as an anti-tilt effect, of the tappet 10 in the yoke 16, and more generally of the tappet 10 in the jacket 15, so that it is not necessary for the second radial clearance $J_B$ to be particularly accurate (and therefore narrow) to ensure a guiding quality of the tappet 10 in the jacket 15.

Of course, the invention is in no way limited to the sole variants described, those skilled in the art being in particular capable of freely isolating or combining together either of the features described in the foregoing, or substituting them with equivalents.

The invention claimed is:

1. A clearance compensation device for a rack, the device comprising:
    a tappet intended to exert a thrust force against a rack, the tappet being movably mounted and guided in translation, according to a thrust axis, in a casing which is arranged to form, on the one hand, an axial stop which hinders the axial recoil of the tappet according to the thrust axis and, on the other hand, a radial stop which hinders the radial distance of the tappet transversely to the thrust axis, and
    an elastic damping member, which is interposed between the tappet and the casing, bearing respectively against a first bearing surface belonging to the tappet and a second bearing surface belonging to the casing,
    wherein the casing includes
        a jacket that extends substantially according to the thrust axis and within which the tappet slides axially, and
        a yoke, distinct from the jacket,
    wherein at least one of the first and second bearing surfaces is a distribution surface and inclined with respect to the thrust axis, and the other of the first and second bearing surfaces is a seat surface and has, facing the distribution surface and against the elastic damping member, at least one radial extension component, which allows the seat surface to act axially on the damping member, and at least one axial extension component, which allows the seat surface to act radially on the damping member so that, when the tappet compresses the elastic damping member against the casing,
    wherein the elastic damping member exerts, in response on the tappet, a retaining force which tends to return simultaneously the tappet axially in the direction of the rack and transversely in the direction of the thrust axis,
    wherein the tappet has an axially-stepped structure including a head portion configured to be slidingly received by the jacket and a foot portion configured to be slidingly received by the yoke, and
    wherein a radial clearance between the foot portion of the tappet and a guide bore of the yoke is strictly smaller than a radial clearance between the head portion of the tappet and an inner wall of the jacket.

2. The device according to claim 1, wherein the elastic damping member is formed by a ring made of elastomer.

3. The device according to claim 1, wherein the rack has a longitudinal axis, according to which it slides relative to the tappet, in that the rack has, in a section transverse to its longitudinal axis, a sliding surface which is generated substantially according to an arc of circle and which cooperates in sliding support on a corresponding receiving surface provided in the tappet, and in that, at least in a section plane that is a frontal plane, substantially perpendicular to the longitudinal axis of the rack and containing the thrust axis, the fictional line is a tilt boundary which passes through a center of a arc of circle generating the sliding surface, on the one hand, and through a center of a cross-section of the damping member, on the other hand, has, with respect to the thrust axis, an opening angle that is a seat angle which is equal to or larger than 20 degrees, and smaller than or equal to 40 degrees.

4. The device according to claim 1, wherein the distribution surface forms a truncated cone centered on the thrust axis, whose apex points in the direction of the axial recoil of the tappet.

5. The device according to claim 1, wherein the angle of inclination of the distribution surface with respect to the thrust axis is between 30 degrees and 60 degrees.

6. The device according to claim 1, wherein the radial extension component and the axial extension component of the seat surface are formed respectively by a first surface portion and a second surface portion secant to each other.

7. The device according to claim 1, wherein the first bearing surface belonging to the tappet forms the inclined distribution surface whereas the second bearing surface belonging to the casing forms the seat surface.

8. The device according to claim 1, wherein the jacket extends from an access aperture opening onto the rack, and the yoke is added and fastened on the jacket so as to obturate the jacket opposite the access aperture, and
wherein the radial and axial extension components of the seat surface are both formed by portions of the yoke.

9. The device according to claim 1, wherein the jacket extends from an access aperture opening onto the rack, and the yoke is added and fastened on the jacket so as to obturate the jacket opposite the access aperture,
wherein the head portion has a shape substantially matching a shape of the inner wall of the jacket opposite which the tappet slides, and
wherein the foot portion axially prolongs the head portion and cooperates with the guide bore so as to guide the tappet in axial translation relative to the yoke.

10. The device according to claim 9, wherein the inclined distribution surface forms the transition between the head portion and the foot portion of the tappet.

11. The device according to claim 10, wherein the inclined distribution surface is prolonged by an annular disengagement groove, axially drilled in the head portion so as to be able to accommodate at least partially the constitutive material of the elastic damping member which flows back when the damping member is deformed under the effect of the compression caused by the recoil of the tappet.

12. The device according to claim 8, wherein the yoke is formed of a polymer material.

13. The device according to claim 5, wherein the angle of inclination of the distribution surface with respect to the thrust axis is 45 degrees.

14. The device according to claim 5, wherein the angle of inclination of the distribution surface with respect to the thrust axis is 55 degrees.

15. The device according to claim 12, wherein the yoke is integrally formed of the polymer material.

16. The device according to claim 2, wherein the ring made of elastomer is an O-ring seal having a circular cross-section.

17. The device according to claim 3, wherein the seat angle is between 20 degrees and 35 degrees.

18. The device according to claim 3, wherein the seat angle is substantially equal to 35 degrees.

19. The device according to claim 6, wherein the radial extension component and the axial extension component intersect substantially at a right angle, so that the seat surface forms a shoulder.

20. The device according to claim 8, wherein the radial and axial extension components of the seat surface are formed respectively by a bottom wall and by a side wall of a counterbore which is drilled in the yoke and centered on the thrust axis.

* * * * *